No. 723,715. PATENTED MAR. 24, 1903.
J. H. McLENNAN & F. W. WANDLESS.
FRICTION CLUTCH.
APPLICATION FILED AUG. 7, 1902.
NO MODEL. 2 SHEETS—SHEET 1.

Witnesses:—
Chas. W. Cou.
Frank L. A. Graham.

Inventors:
John H. McLennan,
Frank W. Wandless,
by their Attorneys;
Howson & Howson

THE NORRIS PETERS CO., PHOTO-LITHO., WASHINGTON, D. C.

No. 723,715. PATENTED MAR. 24, 1903.
J. H. McLENNAN & F. W. WANDLESS.
FRICTION CLUTCH.
APPLICATION FILED AUG. 7, 1902.
NO MODEL. 2 SHEETS—SHEET 2.
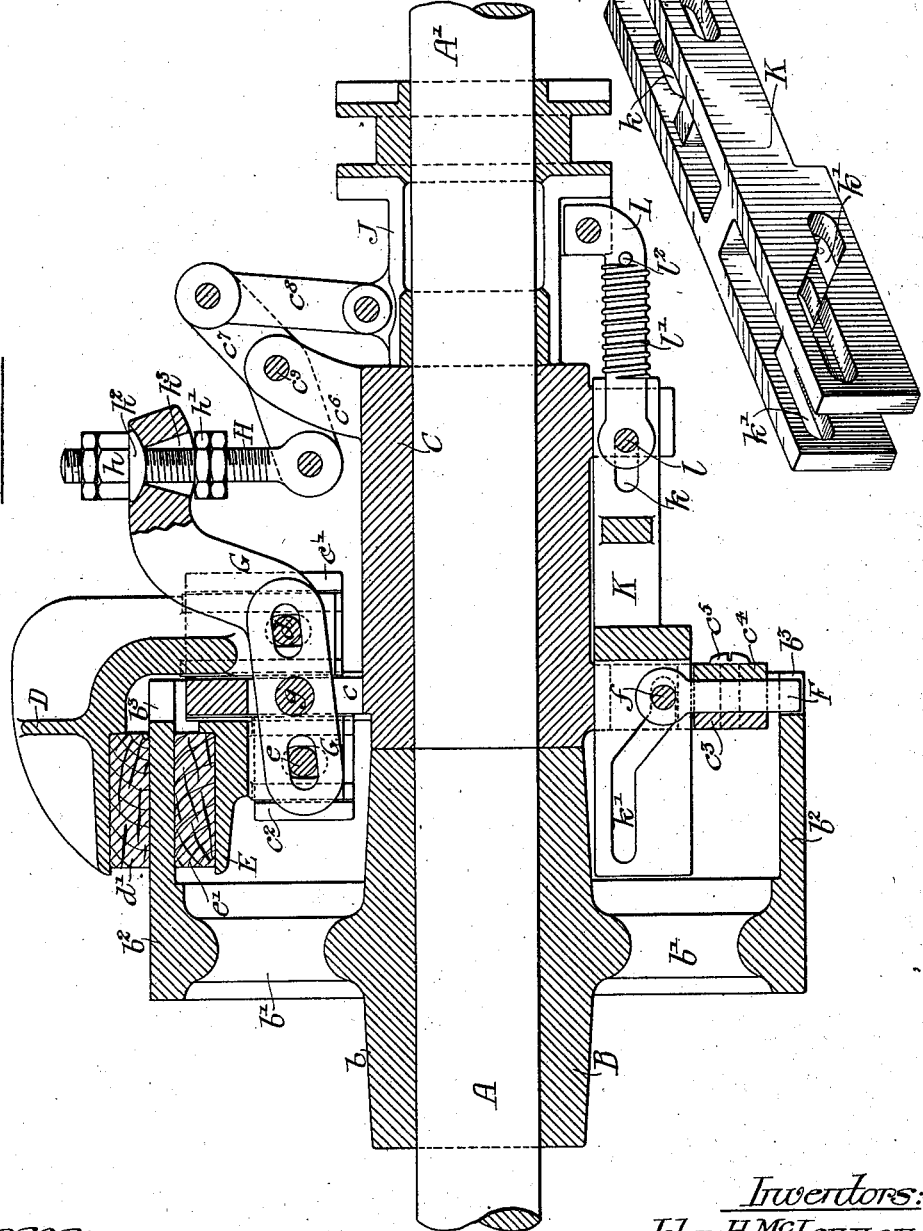

UNITED STATES PATENT OFFICE.

JOHN H. McLENNAN, OF GLOUCESTER CITY, AND FRANK W. WANDLESS, OF CAMDEN, NEW JERSEY.

FRICTION-CLUTCH.

SPECIFICATION forming part of Letters Patent No. 723,715, dated March 24, 1903.

Application filed August 7, 1902. Serial No. 118,825. (No model.)

*To all whom it may concern:*

Be it known that we, JOHN H. MCLENNAN, a resident of Gloucester City, and FRANK W. WANDLESS, a resident of Camden, New Jersey, citizens of the United States, have invented certain Improvements in Friction-Clutches, of which the following is a specification.

Our invention relates to certain improvements in friction-clutches, and more particularly consists in an improved form of positive locking-clutch, the object of the invention being to provide mechanism whereby the members of a friction-clutch may be locked together after the said members have begun to move together under the influence of the frictional connection and may be unlocked from one another before the frictional holding mechanism operates to permit them to move independently. This object we attain as hereinafter set forth, reference being had to the accompanying drawings, in which—

Figure 1:
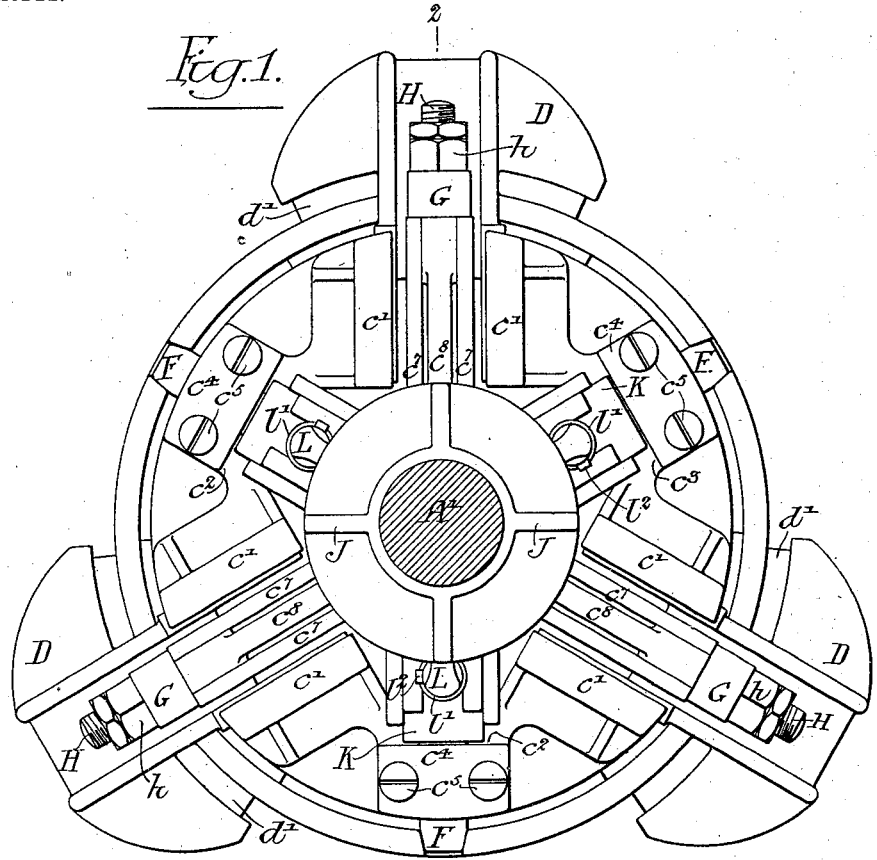
Figure 4:
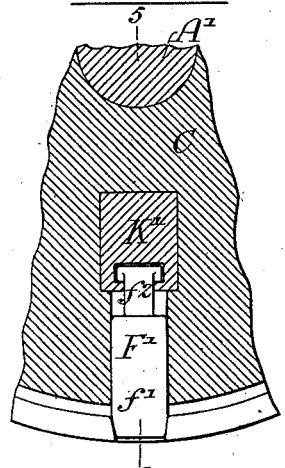
Figure 5:
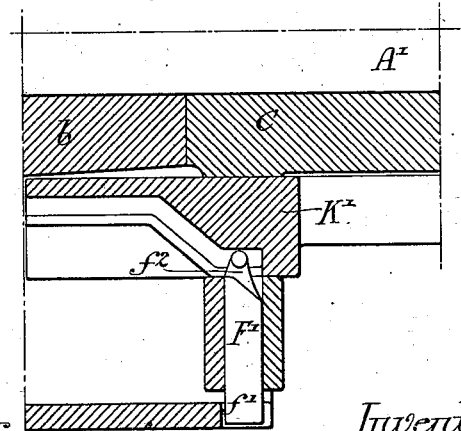
Figure 6:
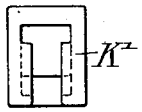

Figure 1 is an end elevation of our improved clutch, showing the relative positions of the locking portions and clutch members. Fig. 2 is a sectional elevation taken on the line 2 2, Fig. 1. Fig. 3 is a perspective view of the locking-slide. Fig. 4 is a transverse sectional view of a slightly-modified form of the locking mechanism. Fig. 5 is a longitudinal sectional view of the modified form of mechanism illustrated in Fig. 4, taken on the line 5 5 of said figure; and Fig. 6 is an end elevation of the locking-slide shown in Figs. 4 and 5.

In the above drawings, A and A' are respectively the end portions of two shafts which it is desired to couple together, and on the first of these is keyed or otherwise suitably fastened a pulley-like structure B, consisting of a hub $b$, spokes $b'$, and a rim $b^2$. This rim we preferably make so that it projects or overhangs to one side, while its inner and outer faces are suitably finished for the accommodation of the gripping or clamping jaws hereinafter described, there being, moreover, any desired number of notches or recesses $b^3$ in one edge of the said rim for the accommodation of locking-bolts.

Upon the end of the shaft A' is keyed a supporting sleeve or hub C, having upon its end adjacent to the pulley-section B a flange portion $c$, certain portions $c'$ of which are shaped to form guides for the outer jaws D of the clutch and other portions $c^2$ upon the opposite side are shaped to act as guides for the inner jaws E. Other portions $c^3$ of the flange $c$ are shaped to act as guides for locking-bolts F, and these guides have cover-pieces $c^4$, held in place by screws $c^5$, by which the portions F are retained in position. There are a number of slots or openings in the flange $c$, through each of which extends a lever G, which is pivoted in position upon a pin $g$ and is provided with elongated slots through which pass pins $d$ and $e$, attached to the inner ends of the jaws D and E, respectively. The jaws D and E may be of any desired construction, and we preferably provide them with the usual wooden gripping-blocks $d'$ and $e'$, respectively. Each of the levers G extends rearwardly and is slotted at the end, as shown at $h^3$ in Fig. 2, for the reception of the adjusting-bolt H, which has outer adjusting-nuts $h$, inner adjusting-nuts $h'$, and a convex washer $h^2$, fitting a concave seat in the recessed end of the lever to permit of swinging motion of the bolt H.

From the end of the sleeve C farthest from the flange $c$ are a series of projections $c^6$, to which are pivoted levers $c^7$, each having one of its free ends pinned to one of the bolts H and the other connected by means of a link $c^8$ to a sliding collar J. The outer end of said collar is provided with a circumferential groove for the reception of an operating-lever (not shown) of the well-known form.

Between each of the sets of jaws D and E we preferably place a locking-bolt F and its accompanying mechanism, consisting of a locking-slide K, movable through a suitable opening in the flange $c$ and yieldingly attached to the sliding collar J by means of a rod L. As shown in Fig. 3, the locking-slide K is formed of two parallel bars rigidly held together and provided at one end with elongated slots $k$ for the reception of a pin $l$, which extends upon both sides of the rod L, there being upon said rod a spring $l'$, confined between the slide K and a pin $l^2$, for the purpose of normally retaining the slide K and the rod L in the relative position shown in Fig. 2. The opposite end of the slide K has in it a pair of inclined or cam-shaped slots $k'$ for the accommodation of a pin $f$, fastened to and extending on both sides of the inner end of the locking-bolt F, whose outer end is beveled or tapered, as illustrated in Fig. 1.

If desired, the bolt F may be made of the form shown at F' in Figs. 4 and 5, with main body-section $f'$ and a T-slotted end extension $f^2$, which latter is adapted to enter and operate in a locking-slide K' of the form shown in Figs. 4, 5, and 6.

In Figs. 1 and 2 the jaws are shown as gripping the rib-section $b^2$ and the locking-bolts F in engagement with the slots in said rib-section, so as to lock the two members of the clutch together. If now the sliding collar J be moved away from the clutch, the rods will move with it and will likewise move the locking-slides K. The slots $k'$ of these slides consist of two parallel portions at different distances from the axis of the shafts A and A', connected by an inclined portion, and as the slides are moved from the position shown in Fig. 2 the sides of these slots will bear upon the pins $f$ and pull the bolts F toward said shaft. The dimensions and arrangement of parts are so calculated that all of the bolts F will be wholly withdrawn from their respective slots $b^3$ before there has been any appreciable downward pull upon the links $c^8$ by the continued motion of the sliding collar J. When, however, such rearward motion of the collar J is continued, the lever $c^7$ is turned on its pivot $c^9$, so that the bolt H is forced upwardly, moving in turn the lever G upon its pivot $g$, with the result that the jaws D and E are moved and held out of contact with the gripping-surfaces of the rim $b^2$. When this operation is reversed—that is, when the sliding collar J is moved toward the sleeve C, the first operation taking place is a toggle action between the links $c^8$ and the lever $c^7$, which results in the pulling downward of the bolt H and the consequent gripping of the rim $b^2$ at the jaws D and E. As this motion of the collar J is taking place, the parts of the slots $k'$ nearest the axis of the shafts are being moved past the pins $f$, so that at the time the jaws have taken hold of the rim $b^2$ the action of the inclined portions of the slots $k'$ upon the pins $f$ will begin, and the bolts F will be forced outwardly if the recesses $b^3$ are opposite to their tapered ends. If, however, this is not the case, then said bolts will merely press upon the inside surface of the rim $b^2$, while the springs $l'$ are compressed as the collar J is moved through the remaining distance toward the hub C and the pins $l$ are moved in the slots $k$. As soon as under the influence of the frictional drive of the jaws D and E the rim $b^2$ is moved to an extent sufficient to bring the recesses $b^3$ in line with the ends of the locking-bolts F the latter will be immediately forced out by the action of the springs $l'$ and the two members of the clutch be locked together, as shown in Fig. 2.

We claim as our invention—

1. The combination in a clutch, of two members, one of the same having a clamping-surface and the other having jaws for engagement with said surface, two levers pivotally carried by the said member, one of said levers having a pin-and-slot connection with the jaws, the slots of said connection being elongated, means for connecting said first lever to the second lever and means for operating said second lever to turn the first lever on its pivot and thereby cause the jaws to engage the clamping-surfaces, substantially as described.

2. The combination in a clutch of two members, one having a clamping-surface and the other having jaws for engaging the same, a lever pivotally supported by the second member and engaging the jaws, a second lever also supported by the second member of the clutch, a bolt connected at one end to one of said levers, a nut on the bolt in engagement with the other lever, one of the members comprised by said nut and the lever having a cavity and the other member having a rounded portion for the same, with means for swinging the second of the levers upon its pivot, substantially as described.

3. The combination with a clutch, of a member with a clamping-surface and a second member with jaws engaging said surface, of mechanism for throwing said jaws into and out of action, a sliding bolt on one of the clutch members, and a piece movable in a line parallel to the axis of the clutch, said piece being connected to the jaw-actuating mechanism and one of the two members comprised by the bolt and said piece having a cam-surface and the other having a portion in engagement with the same, whereby the two members of the clutch are locked together after the jaws have been thrown into engagement with the clamping-surface, substantially as described.

4. The combination with a clutch having a sliding collar, of a slide, a rod connecting said slide to the collar, one of said members having a slot and the other having a portion constructed to move therein, a spring between the rod and the slide, and a bolt in engagement with the slide for positively locking the members of the clutch together after they are held together by friction, substantially as described.

5. The combination in a clutch, of a clamping-surface having a recess, jaws for engaging with said clamping-surface, means for operating said jaws, a reciprocable slide, a bolt operated thereby and placed to engage the recess in the clamping-surface, with means whereby said slide is caused to actuate the bolt after the jaws have operatively engaged the clamping-surface, substantially as described.

6. The combination in a clutch, of two members including a clamping-surface and jaws for engagement therewith, means including a movable collar for actuating said jaws, a slide connected to said collar independently of said actuating means and a bolt operatively connected to the slide and constructed to move into and out of engagement with one of the members of the clutch, substantially as described.

7. The combination in a clutch of two members including jaws and a surface for engagement by the same, a sliding collar and means for connecting said jaws to said collar, a slide attached to the collar independently of the jaws and of their connecting means, said slide having a bolt placed to lock together the two clutch members and a yielding connection between the sliding collar and the slide, substantially as described.

8. The combination in a clutch, of a sliding collar, a slide and a bolt actuated thereby for positively locking the members of the clutch together, and a rod connecting the collar and the slide, said rod being connected to said slide so as to be free to move relatively thereto and having a spring acting to prevent such motion, substantially as described.

9. The combination with a clutch having a sliding collar, of a slide, a rod connecting said slide to the collar, one of said members having an elongated slot and the other having a portion constructed to move therein, and a bolt in engagement with the slide for positively locking the members of the clutch together after they are held together by friction, substantially as described.

10. The combination in a clutch, of two members including jaws and a surface for engagement by the same, a collar, mechanism including a slide, yieldingly connected to said collar, and a bolt engaged by the slide and placed to lock together the two members of the clutch, substantially as described.

11. The combination of a clutch having two members, including a portion having a clamping-surface and jaws for engagement with the same, a collar, a slide having a cam-surface, a bar connecting the collar and the slide, having a spring engaging the bar at one end and engaging one of the members comprised by the slide and the collar at its other end, and a bolt having a portion in engagement with the cam-surface on the slide and constructed to engage one of the members of the clutch under certain conditions of operation of said clutch, substantially as described.

In testimony whereof we have signed our names to this specification in the presence of two subscribing witnesses.

JOHN H. McLENNAN.
FRANK W. WANDLESS.

Witnesses:
WILLIAM E. BRADLEY,
JOS. H. KLEIN.